United States Patent [19]
Samarov et al.

[11] Patent Number: 5,217,198
[45] Date of Patent: Jun. 8, 1993

[54] UNIFORM SPATIAL ACTION SHOCK MOUNT

[75] Inventors: Victor M. Samarov, Carlisle; George A. Doumani, N. Andover; William J. Pauplis, Hudson, all of Mass.

[73] Assignee: Digital Equipment Corporation, Maynard, Mass.

[21] Appl. No.: 721,745

[22] Filed: Jun. 26, 1991

[51] Int. Cl.⁵ ............................................. F16M 13/00
[52] U.S. Cl. .................................. 248/638; 248/629; 248/628; 248/630; 262/152; 262/164
[58] Field of Search ............... 248/638, 636, 604, 619, 248/626, 628, 629, 630; 267/152, 30, 164

[56] References Cited

U.S. PATENT DOCUMENTS

| | | | |
|---|---|---|---|
| 1,823,115 | 9/1931 | Morriss . | |
| 2,018,180 | 10/1935 | Lawton . | |
| 2,096,621 | 10/1937 | Skolfield . | |
| 2,492,965 | 1/1950 | Carr . | |
| 2,913,215 | 11/1959 | Kerley, Jr. et al. | 248/628 |
| 3,066,905 | 12/1962 | Gortel | 248/638 X |
| 4,172,590 | 10/1979 | Jarret et al. | 267/152 X |
| 4,934,724 | 6/1990 | Allsop et al. | 267/30 X |

FOREIGN PATENT DOCUMENTS 538236  7/1947  United Kingdom .................. 248/65

*Primary Examiner*—Alvin C. Chin-Shue
*Attorney, Agent, or Firm*—Denis G. Maloney; Barry Young; Ronald Myrick

[57] ABSTRACT

A shock and vibration isolating device is provided for mounting a component on a supporting structure while absorbing with substantially equalized reaction force relative movement between the component and the supporting structure occurring in all of the three mutually orthogonal planes in which the dynamic loading of the component can occur. The device includes an open frame planar spring element lying in a plane parallel to one of the mutually orthogonal planes, the spring element composed of a core member of a low creep, high modulus, metal and a shell member of a plastic exhibiting high internal dynamic loss substantially encompassing said core. A first cantilever section adjacent a first end is mounted to the supporting structure; a second cantilever section parallel to the first cantilever section adjacent a second end is mounted to the component; and a bridge section connects the first and second cantilever sections and is perpendicular thereto. The ratio of the lengths of the first cantilever section to the second cantilever section to the bridge section is substantially 1.84 : 1.09 : 1.00.

16 Claims, 2 Drawing Sheets

UNIFORM SPATIAL ACTION SHOCK MOUNT

BACKGROUND OF THE INVENTION

1. Field of the Invention

The present invention relates generally to apparatus for isolating a component from mechanical shock and vibration and, more particularly, to such a device which is uniformly effective in all directions and exhibits a generally convoluted open frame support structure.

2. Description of the Prior Art

It has long been a goal to isolate certain items against mechanical shock and vibration while adequately supporting such items. Because of the generally complex and fragile nature of electronic circuitry and components, electronic equipment is a prime candidate for such a requirement. The prior art is replete with examples of constructions for providing isolative support for a variety of items. Some of these examples are very old, which is a clear indication that the problem has existed for a long time.

Typical of an early construction is U.S. Pat. No. 1,823,115 to Morriss which discloses, an elastic suspension for a perambulator, or baby carriage, incorporating a C-shaped member in its suspension. Other early concepts relating to supporting structures for electric motors are disclosed in U.S. Pat. Nos. 2,018,180 to Lawton and No. 2,096,621 to Skolfield. In the former instance, flat springs are preferably bent back upon themselves to form loop portions. In the latter instance, an elastic fan-motor supporting arm is designed to decouple circumferential and transverse noise-generating vibrations of the rotating parts from the fan support structure, said thereby to reduce structure-borne noise.

U.S. Pat. No. 2,492,965 to Carr discloses a resilient mount for landing skis of an aircraft in the form of a curved, C-shaped leaf spring rigidly attached to the ski and by way of a single-axis pivot to the axle of the wheel of the aircraft's landing gear.

More recently, U.S. Pat. No. 2,913,215 to Kerley, Jr. et al. discloses a shock and vibration isolator designed for isolation in "all three planes", and made in the form of a flexible, curved sheet of metal or the like, on at least one face of which rubber or other similar material is secured. The patent states that ". . . isolation is achieved without any critical frequency range except in edgewise high frequency vibration". In this regard, however, the assertion by Kerley, Jr. et al. that a one-piece elasto-viscous mount has no resonant range, as distinguished from, for example, a sophisticated active automatic control system, is challenged.

It was in recognition of the continuing need to protect dynamic load-sensitive equipment, such as a mass storage device, against shock and vibration that the present invention has been conceived and is now reduced to practice.

SUMMARY OF THE INVENTION

The present invention is characterized by a shock and vibration isolating device which is provided for mounting a component on a supporting structure while absorbing with substantially equalized reaction force relative movement between the component and the supporting structure occurring in all of the three mutually orthogonal planes in which the dynamic loading of the component can occur. The device includes an open frame planar spring element lying generally in a plane parallel to one of the mutually orthogonal planes. The spring element is a composite of two isotropic materials which form the core and the external shell, respectively, the core member being composed of a low creep, high modulus, metal and the shell member being composed of a plastic or elastomer exhibiting high internal dynamic loss substantially encompassing the core.

A first cantilever section adjacent a first end is mounted to the supporting structure; a second cantilever section parallel to the first cantilever section adjacent a second end is mounted to the component; and a bridge section connects the first and second cantilever sections and is perpendicular thereto. The invention is further characterized in that the two cantilever sections and the one bridge section have substantially identical elliptical cross sections having constant dimensions with the major axis of the ellipse for both the core and the shell being positioned normal to the plane of the open frame of the spring element. Additionally, in a preferred embodiment, the ratio of the width to height of both the shell and the core is substantially 3:1. Furthermore, the relative widths, that is, distance along the major ellipse axis, for the shell and the core is in the range of ratios of between approximately 2:1 and 4:1. Similarly, the relative heights, that is, distance along the minor ellipse axis for the shell and the core is in the same range. In order to achieve the equality of isolation action of the mount of the invention, with equal effect, in any of the three mutually orthogonal planes relative to the component being mounted, and its supporting structure, the ratio of the lengths of the first cantilever section to the second cantilever section to the bridge section is substantially 1.84 : 1.09 1.00.

Minimal bending moments are transmitted to the component by reason of the presence of structurally weakened sections integrally formed into the mount proximate one of its ends, the geometric parameter of the frame being selected such that dynamic forces created by the component at that end are substantially equal along all of the spatial axes. By reason of its construction, the shock and vibration isolating device of the invention serves to provide a simple, economical, and versatile elastic mount for the substantially spatially uniform isolation of a dynamic load-sensitive component such as a mass-storage device, mounted on a support, such as an enclosure. Such isolation is achieved from external shock and/o vibration applied to the support along any of three mutually orthogonal spatial axes, such that the mounts can be positioned, with equal effect in any of the three mutually orthogonal planes relative to the component and to the enclosure.

The mount of the invention is of simplified design, easily manufactured, and constructed of readily available materials. It can be mounted to a broad range of instruments and the like to be protected against mechanical shock and vibration.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of th invention in general terms.

DETAILED DESCRIPTION OF THE PREFERRED EMBODIMENT

Figure 1:
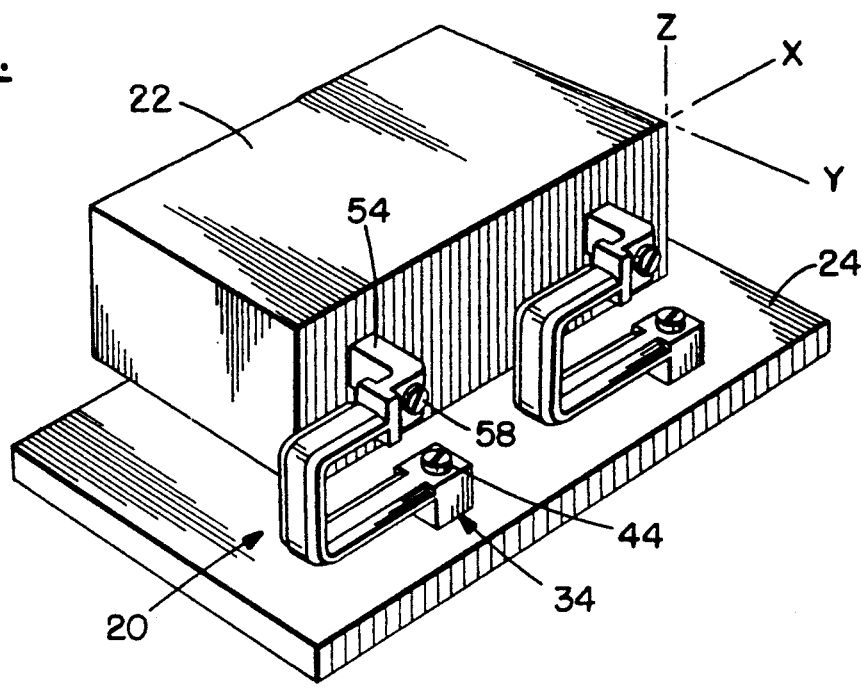
FIG. 1 is a perspective view illustrating an application of a mechanical shock and vibration isolating device embodying the invention.
Figure 2:
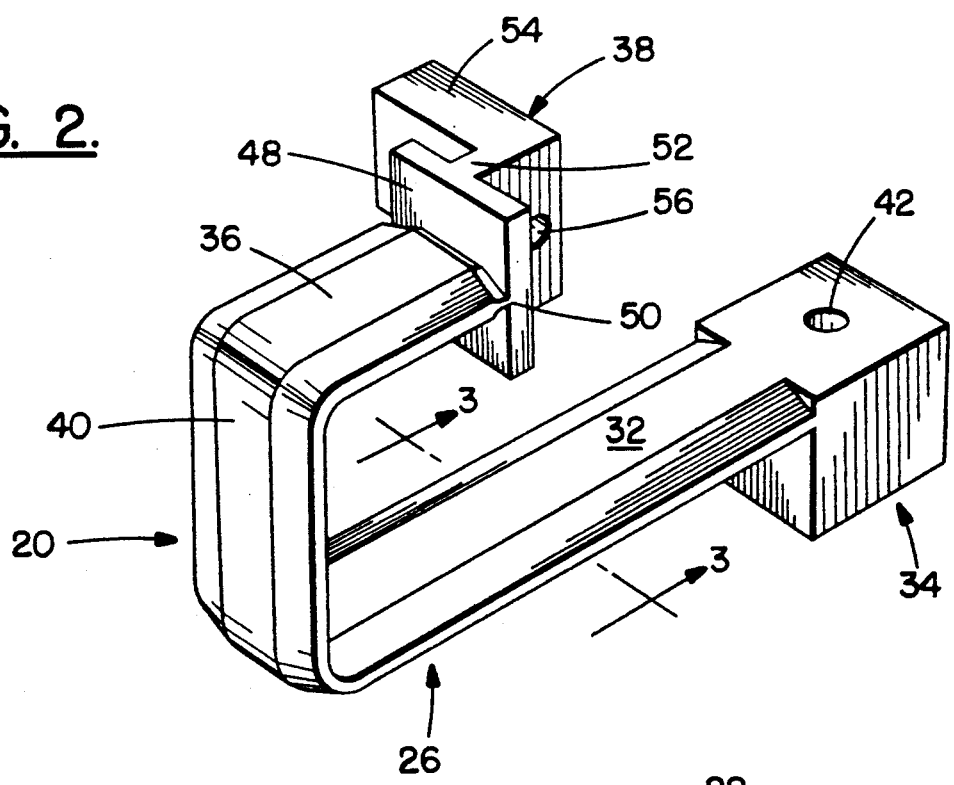
FIG. 2 is a perspective view illustrating in more detail the shock and vibration isolating device of the invention.

Turn now to the drawings, and, initially, to FIGS. 1 and 2 which illustrate at 20 a shock and vibration isolating device which embodies the present invention. In FIG. 1, the device 20 serves to mount a component 22 which may be a dynamic load-sensitive component such as a mass storage device, on a supporting structure 24 such as an enclosure. As illustrated, a plurality of the devices 20 may be employed to provide spatially uniform isolation of the component 22 from external shock and/or vibration which is applied to the supporting structure 24 along any of three orthogonal spatial axis characterized as x, y, and z, respectively.

In order to achieve this uniform and substantial isolation of the component 22 from the supporting structure 24, it has been found desirable to construct the device 20 as an open frame, spring element 26 which lies in a plane parallel to one of the mutually orthogonal planes in which the dynamic loading of the component 22 occurs.

Figure 3:
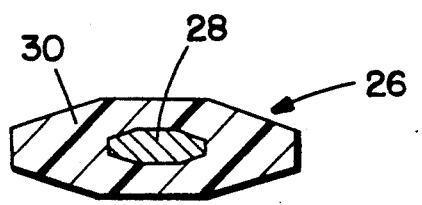
FIG. 3 is a cross section view taken generally along line 3—3 in FIG. 2.
Figure 4:
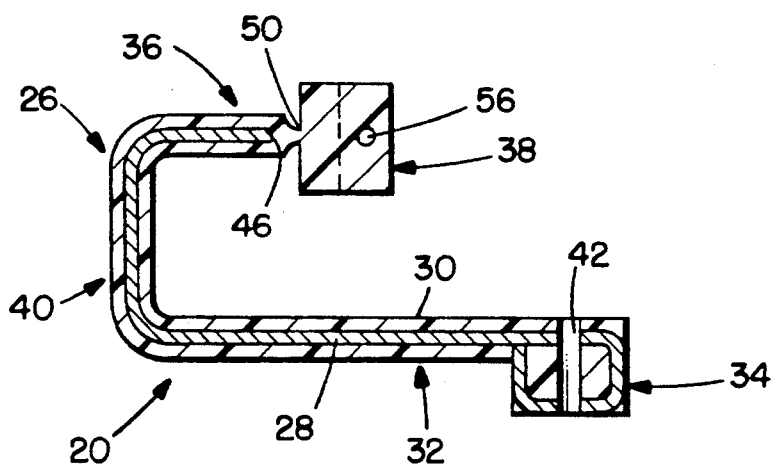
FIG. 4 is a longitudinal cross section view of the device.
Figure 5:
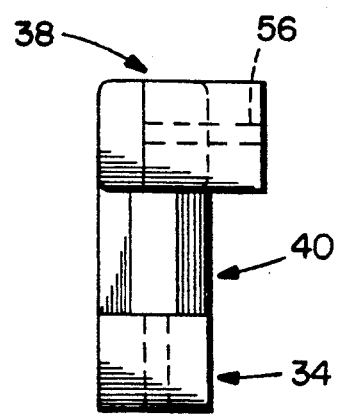
FIG. 5 is an end elevation view of the device.
Figure 6:
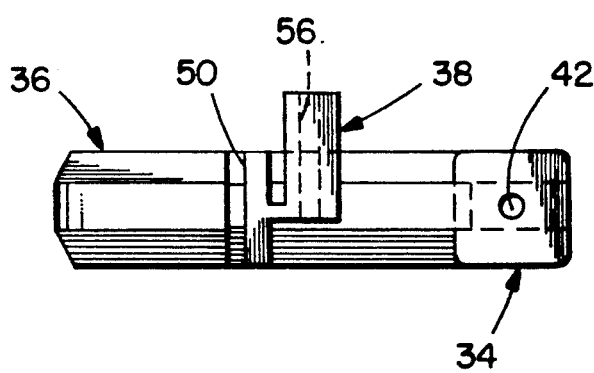
FIG. 6 is a top plan view of the device.

Turning now to FIGS. 3 and 4, spring element 26 is of a unique construction being a composite of two isotropic materials including a core 28 and an external shell 30 substantially encompassing the core. The core 28 is composed of a low-creep, high-modulus elastic material such as spring steel, and the shell 30 is composed of elastomer or a plastic with a high internal dynamic loss to provide vibration damping. As previously noted, the spring element 26 is generally "C" shaped, being a planar, open frame whose plane is parallel to a plane defined by any pair of the three mutually orthogonal axis. In the instance depicted in FIG. 1, the spring element 26 lies in a plane parallel to a plane defined by the axes x and z.

The spring element 26 includes a first cantilever section 32 adjacent a first end 34 intended for mounting to the supporting structure 24. A second cantilever section 36 is generally parallel to the first cantilever section 32 and extends to a second end 38 intended for mounting to the component 22. A bridge section 40 serves to connect the first and second cantilever sections 32, 36 and is generally perpendicular to those sections. All three sections, namely 32, 36 and 40, have identical constant elliptical cross section with the major axes of the eclipse for both the core 28 and the shell 30 being normal to the plane of the spring element 26. The relationship between width and height for each of the shell 30 and the core 28 is in the ratio of substantially 3:1. Furthermore, the relative lengths of the external shell 30 and of the core 28 along their major axes in cross section (FIG. 3) is in the range of between approximately 2:1 and 4:1. Similarly, a preferred ratio of lengths of the shell and of the core along their minor axes is in the same range. Additionally, the ratio of the lengths of the first cantilever section 32 to the second cantilever section 36 to the bridge section is substantially 1.84 : 1.09 : 1.00.

With particular attention now to FIG. 4, the core 28 is seen to emerge from the shell 30 at the first end 34 and is folded into the shape of a transverse loop or ring with its free end abutting itself and a mounting hole 42 is formed therethrough for the appropriate reception of a fastener 44 (FIG. 1) for mounting to the supporting structure 24.

At the opposite end of spring element 26, the core 28 is seen to terminate short of the second end 38, the second end 38 being comprised solely of the material of which the external shell 30 is composed.

Beyond a terminal end 46 of the core 28, shell 30 extends to a terminal plate 48 via a weakened region 50, then via a web 52 of reduced cross section to a mounting block 54. A mounting hole 56 extends through the mounting block 54 for reception therethrough of a suitable fastener 58 (FIG. 1) for mounting to the component 22.

Together with the general open frame shape of the spring element 26 and the composite structure of the spring element as particularly well seen in FIG. 3, the construction of the device 20 at its second end 38 is of critical importance in achieving the equality of isolation action of the device along each of the three orthogonal spatial axes x, y, and z. At the second end 38, the use, solely, of the elastomeric or plastic material comprising the shell 30 for mounting to the component 22 assures vibration damping to a maximum extent. Furthermore, by reason of the flexurally weakened region 50, substantially no bending moments are transmitted to the component 22 through the second end 38.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A shock and vibration isolating device for mounting a component on a supporting structure comprising:

yieldable support means for absorbing with substantially equalized reaction force relative movement between the component and the supporting structure occurring in all of three mutually orthogonal planes in which the dynamic loading of the component can occur, said support means including an open frame spring element lying in a plane parallel to one of said mutually orthogonal planes, said spring element composed of a core member of a low creep, high modulus, metal and a shell member of a plastic exhibiting high internal dynamic loss substantially encompassing said core.

said core member emerging from said shell member at said first end of said spring element for mounting said support means to the supporting structure, and said shell member extending beyond said core member at said second end for mounting said support means to the component.

2. A shock and vibration isolating device as set forth in claim 1 wherein said spring element includes:

a first cantilever section adjacent said first end mounted to the supporting structure;

a second cantilever section parallel to said first cantilever section adjacent said second end mounted to the component; and a bridge section connecting said first and second cantilever sections and perpendicular thereto;

wherein the ratio of the lengths of said first cantilever section to said second cantilever section to said bridge section is substantially 1.84 : 1.09 : 1.00.

3. A shock and vibration isolating device as set forth in claim 2 including:

a weakened region in said shell member intermediate said core member and said second end;

whereby minimized bending stresses are transmitted between the component and the supporting structure.

4. A shock and vibration isolating device as set forth in claim 2 wherein each of said first and second cantilever sections and said bridge section has an elliptical cross section, whose major axis is perpendicular to the plane of said spring element and whose minor axis lies in the plane of said spring element.

5. A shock and vibration isolating device as set forth in claim 4 wherein the cross section of said spring element is constant along its length.

6. A shock and vibration isolating device as set forth in claim 5 wherein the ratio of length of the major axis of said elliptical cross section to length of the minor axis thereof is approximately 3:1.

7. A shock and vibration isolating device as set forth in claim 6 wherein the ratio of the width of said shell to the width of said core remains constant throughout the length of said spring element and is in a range of ratios of between approximately 2:1 and 4:1; and wherein the ratio of the thickness of said shell to the thickness of said core remains constant throughout the length of said spring element and is in a range of ratios of between approximately 2:1 and 4:1.

8. A shock and vibration isolating device for mounting a component on a supporting structure comprising:

an open frame spring element lying in a plane parallel to one of three mutually orthogonal planes in which the dynamic loading of the component can occur, said spring element composed of a core of a low creep, high modulus, metal and a shell of a plastic exhibiting high internal dynamic loss substantially encompassing said core for absorbing with substantially equalized reaction force relative movement between the component and the supporting structure occurring in all of said three mutually orthogonal planes, said spring element extending between first and second ends, said core emerging from said shell at said first end of said spring element for mounting to the supporting structure;

said shell extending beyond said core at said second end for mounting to the component.

9. A shock and vibration isolating device as set forth in claim 8 including:

first mounting means for attaching said first end of said spring element to the supporting structure; and second mounting means for attaching said second end of said spring element to the component.

10. A shock and vibration isolating device as set forth in claim 8, wherein each of said core and said shell, at least at said central regions of said spring element spaced from said first and second ends, is of substantially elliptical cross section.

11. A shock and vibration isolating device as set forth in claim 10 wherein said core is folded at said first end to form a box member having opposed spaced apart generally parallel sides with mounting holes therethrough; and including fastener means receivable through the holes in said box member to mount said spring element to said supporting structure;

wherein said shell has amounting hole therethrough at said second end of said spring element; and including fastener means receivable through the mounting hole in said shell to mount said spring element to said supporting structure.

12. A shock and vibration isolating device as set forth in claim 8, wherein said spring element includes:

a first cantilever section adjacent said first end;

a second cantilever section adjacent said second end; and a bridge section connecting said first and second cantilever sections.

13. A shock and vibration isolating device as set forth in claim 12 wherein said first and second cantilever sections are parallel; and wherein said bridge section is perpendicular to said first and second cantilever sections.

14. A shock and vibration isolating device as set forth in claim 13, wherein the ratio of the lengths of said first cantilever section to said second cantilever section to said bridge section is substantially 1.84 : 1.09 : 1.00.

15. A shock and vibration isolating device as set forth in claim 8 including:

second mounting means for attaching said second end of said spring element to the component; and a weakened region in said shell intermediate said core and said second mounting means;

whereby minimized bending stresses are transmitted between the component and the supporting structure.

16. A shock and vibration isolating device for mounting a component on a supporting structure comprising:

an open frame spring element lying in a plane parallel to one of three mutually orthogonal planes in which the dynamic loading of the component can occur, said spring element composed of a core of a low creep, high modulus, metal and a shell of a plastic exhibiting high internal dynamic loss substantially encompassing said core for absorbing with substantially equalized reaction force relative movement between the component and the supporting structure occurring in all of said three mutually orthogonal planes, said spring element including:

a first cantilever section adjacent a first end, said core emerging from said shell at said first end for mounting to the supporting structure;

a second cantilever section parallel to said first cantilever section adjacent a second end, said shell extending beyond said core at said second end for mounting to the component; and a bridge section connecting said first and second cantilever sections and perpendicular thereto;

wherein the ratio of the lengths of said first cantilever section to said second cantilever section to said bridge section is substantially 1.84 : 1.09 : 1.00.

* * * * *